(12) United States Patent
Abrol et al.

(10) Patent No.: US 6,463,034 B1
(45) Date of Patent: Oct. 8, 2002

(54) METHOD AND APPARATUS FOR AVOIDING DATA LOSS DURING A PPP RENEGOTIATION ON A $U_M$ INTERFACE

(75) Inventors: Nischal Abrol, San Diego, CA (US); Marcello Lioy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/353,108

(22) Filed: Jul. 14, 1999

(51) Int. Cl.[7] .............................. H04B 3/20; H04L 1/00; H04L 12/26
(52) U.S. Cl. ........................................ 370/229; 370/236
(58) Field of Search ................................ 370/229, 230, 370/231, 235, 236, 238, 287

(56) References Cited

U.S. PATENT DOCUMENTS

| | | | | |
|---|---|---|---|---|
| 5,793,744 A | * | 8/1998 | Kanerva et al. | 370/209 |
| 6,052,385 A | * | 4/2000 | Kanerva et al. | 370/468 |
| 6,057,943 A | * | 5/2000 | Kweon et al. | 358/435 |
| 6,111,866 A | * | 8/2000 | Kweon et al. | 370/335 |
| 6,201,976 B1 | * | 3/2001 | Rasanen | 455/557 |
| 6,230,024 B1 | * | 5/2001 | Wang et al. | 455/557 |

FOREIGN PATENT DOCUMENTS

| | | |
|---|---|---|
| WO | WO 97/22196 | 6/1997 |
| WO | WO 98/15106 | 4/1998 |

* cited by examiner

*Primary Examiner*—Alpus H. Hsu
*Assistant Examiner*—Toan Nguyen
(74) *Attorney, Agent, or Firm*—Philip R. Wadsworth; Challos D. Brown; George C. Pappes

(57) ABSTRACT

A method and a wireless communication device capable of flow controlling data to be sent from a TE2 device over a $R_m$ interface when PPP renegotiation occurs over a $U_m$ interface. Flow control is asserted by the MT2 device by means of manipulating electrical signaling of a physical interface between the MT2 device and the TE2 device. A second embodiment provides a method and a wireless communication device for buffering data on the MT2 device when the PPP renegotiation of the $U_m$ interface occurs. In a third embodiment, data is buffered when the PPP renegotiation of the $U_m$ interface occurs. When an amount of free buffer space is less that a predetermined threshold, flow control is asserted to the TE2 device.

16 Claims, 5 Drawing Sheets

METHOD AND APPARATUS FOR AVOIDING DATA LOSS DURING A PPP RENEGOTIATION ON A $U_M$ INTERFACE

BACKGROUND OF THE INVENTION

I. Field of the Invention

The present invention relates to the field of wireless data services. More particularly, the present invention relates to a novel and improved method and system for preventing data loss during a Point-to-Point Protocol (PPP) renegotiation over a $U_m$ interface between a wireless communication device (MT2) and a base station/mobile switching center (BS/MSC).

II. Description of Related Art

Internetworking, i.e., the connection of individual local area networks (LANs), has rapidly become very popular. The infrastructure and associated protocols commonly referred to as the "Internet" have become well known and widely used. A well known protocol for providing access to the Internet is the Point-to-Point Protocol (PPP) which provides a standard method for transporting multi-protocol datagrams over point-to-point, and is further described in Request for Comment (RFC) 1661, W. Simpson, Editor, dated July 1994, herein incorporated by reference.

PPP includes three main components:

1. a method of encapsulating multi-protocol datagrams;
2. a Link Control Protocol (LCP) for establishing, configuring, and testing a data link connection; and
3. a family of Network Control Protocols (NCPs) for establishing and configuring different network-layer protocols.

FIG. 1 illustrates a high-level block diagram of a wireless data communication system in which a mobile terminal (TE2 device) 102 communicates with an interworking function (IWF) 108 via a wireless communication system which includes a wireless communication device (MT2) 104 and Base Station/Mobile Switching Center (BS/MSC) 106. In FIG. 1, the IWF 108 serves as the access point to the Internet. IWF 108 is coupled to, and often co-located with BS/MSC 106, which may be a conventional wireless base station, as is known in the art. TE2 device 102 is coupled to MT2 device 104, which is in wireless communication with BS/MSC 106 and IWF 108.

Many protocols exist which allow data communication between the TE2 device 102 and the IWF 108. For example, Telecommunications Industry Association (TIA)/Electronics Industries Association (EIA) Interim Standard IS-707.5, entitled "Data Service Options for Wideband Spread Spectrum Systems: Packet Data Services," published February 1998, and herein incorporated by reference, defines requirements for support of packet data transmission capability on TIA/EIA IS-95 wideband spread spectrum systems, of which BS/MSC 106 and IWF 108 may be a part. IS-707.5 also provides the requirements for communication protocols on the links between the TE2 device 102 and the MT2 device 104 (the $R_m$ interface), between the MT2 device 104 and the BS/MSC 106 (the $U_m$ interface), and between the BS/MSC 106 and the IWF 108 (the L interface).

Referring now to FIG. 2, a diagram of the protocol stacks in each entity of the IS-707.5 Relay Model is shown. FIG. 2 corresponds roughly to FIG. 1.4.2.2-1 of IS-707.5. At the far left of the figure is a protocol stack, shown in conventional vertical format, showing the protocol layers running on the TE2 device 102 (e.g., the mobile terminal, laptop or palmtop computer). The TE2 protocol stack is illustrated as being logically connected to the MT2 device 104 protocol stack over the $R_m$, interface. The MT2 device 104, is illustrated as being logically connected to the BS/MSC 106 protocol stack over the $U_m$ interface. The BS/MSC 106 protocol stack is, in turn, illustrated as being logically connected to the IWF 108 protocol stack over the L interface.

As an example of the operation of the protocols of FIG. 2, the Point to Point Protocol ($PPP_R$) protocol 206 encodes packets from the upper layer protocols 202, 204 and transmits them across the $R_m$ interface using the EIA-232 protocol 208 to the EIA-232-compatible port on the MT2 device running the EIA-232 protocol 210. In addition to using the EIA-232 protocol, other protocols may also be used, e.g. USB/IRDA/Bluetooth may be used. The EIA-232 protocol 210 on the MT2 device, receives the packets and passes them to the $PPP_R$ protocol 205. The $PPP_R$ protocol 205 unframes the packets encapsulated in PPP frames and typically, when a data connection is up, passes the packets to $PPP_U$ protocol 215, which frames the packets in PPP frames for transmission to a PPP peer located in the IWF (108). The Radio Link Protocol (RLP) 212 and IS-95 protocol 214, both of which are well known in the art, are used to transmit the packets, which are encapsulated in PPP frames, to the BS/MSC 106 over the $U_m$ interface. RLP is a family of radio link protocols. The RLP protocol 212 is defined in IS-707.2, entitled "Data Service Options for Wideband Spread Spectrum Systems: Radio Link Protocol", February 1998, herein incorporated by reference, and the IS-95 protocol is defined in IS-95 mentioned above. A complementary RLP protocol 216 and IS-95 protocol 218 in the BS/MSC 106 pass the packets to the relay layer protocol 220 for transmission across the L interface to relay layer protocol 228. $PPP_U$ protocol 226 then unframes the received packets and passes them to the network layer protocols 225, which in turn passes them to upper layer protocols 221. As is well known to those skilled in the art, instead of using the RLP protocol, the RLP2 protocol could be used. It is defined in Telecommunications Industry Association (TIA)/Electronics Industries Association (EIA) Interim Standard IS-707A.8, entitled "Data Service Options for Spread Spectrum Systems: Radio Link Protocol Type 2," published April 1999. Other RLP protocols which may be used are RLP3 and RLP for CDMA2000.

As described in RFC 1661, the LCP Packets comprise a Configure-Request, a Configure-Ack, a Configure-Nak, and a Configure-Reject. The format of these packets is well known and described in RFC 1661.

The Configure-Request packet is used to negotiate configuration options. All configuration options are always negotiated simultaneously.

The Configuration-Ack packet is transmitted if every configuration option in a received Configuration-Request packet is recognizable and all values are acceptable.

The Configure-Nak packet is sent in response to a Configuration-Request packet when the requested configuration options are recognizable, but some of the values are not acceptable. The Options field of the Configure-Nak packet are filled only with the unacceptable configuration options from the Configure-Request packet. Note that all configuration options are always Nak'd simultaneously.

The Configure-Reject packet is sent when a received Configure-Request includes configuration options that are unrecognizable or are not acceptable for negotiation. The options field of the Configure-Reject contains only the unacceptable configuration options from the Configure-Request.

The following comprises the well-known configuration options, described in RFC 1661, and defined for the PPP LCP protocol:

1. Maximum-Receive-Unit
2. Authentication-Protocol
3. Quality-Protocol
4. Magic-Number
5. Protocol-Field-Compression
6. Address-and-Control-Field-Compression Internet Protocol Control Protocol (IPCP) is a network control protocol responsible for configuring, enabling, and disabling Internet Protocol (IP) modules on both ends of the PPP link. IPCP is described in Request for Comment (RFC) 1332, "The PPP Internet Protocol Control Protocol (IPCP)", G. McGregor Merit, May 1992, herein incorporated by reference. IPCP configuration options include:

1. IP-Addresses;
2. IP-Compression-Protocol; and
3. IP-Address

IPCP uses the same option negotiation mechanism as the Link Control Protocol (LCP).

LCP and IPCP Configuration option negotiations occur separately for both the $R_m$ interface and the $U_m$ interface. That is, LCP or IPCP configuration option negotiation over one of the $R_m$ and $U_m$ interfaces is separate from LCP or IPCP configuration option negotiation over the other of the $R_m$ and $U_m$ interfaces. Therefore, the wireless communication device must separately negotiate configuration options over the $R_m$ and $U_m$ interfaces. Because the wireless communication device (MT2) is mobile, the wireless communication device (MT2) may move to an area that is served by a different IWF 108. When this happens, a handoff will occur, handing the MT2 device over to the new IWF 108 for service. When a handoff occurs, the LCP and IPCP links must be renegotiated over the $U_m$ interface, as discussed above. Because PPP negotiation for the $R_m$ and $U_m$ interfaces are independent, PPP renegotiation need only occur on the $U_m$ interface.

During PPP renegotiation of the $U_m$ interface, data cannot be transferred over the $U_m$ interface, however, the TE2 device may continue to send data to the MT2 device over the $R_m$ interface. Thus, it is possible for the MT2 device to receive data over the $R_m$ interface without being able to forward the data over the $U_m$ interface. If the PPP renegotiation continues over a long period of time, the MT2 device will no longer be able to process data received over the $R_m$ interface and data loss will occur.

SUMMARY OF THE INVENTION

A first embodiment of the present invention is a method and a wireless communication device (MT2) 104 capable of flow controlling data to be sent from the TE2 102 device over the $R_m$ interface when PPP renegotiation is occurring over the $U_m$ interface. Flow control can be asserted by the MT2 device 104 by means of manipulating electrical signalling of a physical interface between the MT2 device 104 and the TE2 device 102 or by using software flow control—XON/XOFF.

A second embodiment of the present invention, is a method and a wireless communication device (MT2) 104 for buffering data, received from the TE2 device 102, on the MT2 device 104 during PPP renegotiation of the $U_m$ interface.

A third embodiment of the present invention is a method and a wireless communication device (MT2) 104 for buffering data on the MT2 device 104 when PPP renegotiation of the $U_m$ interface occurs. When an amount of free buffer space is less than a predetermined threshold, the MT2 device 104 asserts flow control to the TE2 device 102. When PPP renegotiation of the $U_m$ interface is not occurring, flow control of the TE2 device 102 over the $R_m$ interface is disabled, thereby allowing data to flow from the TE2 device 102 to the MT2 device 104.

Thus, the present invention provides an improved wireless communication device and an improved method of preventing data loss during PPP renegotiation.

BRIEF DESCRIPTION OF THE DRAWINGS

These and other advantages will become more apparent from the detailed description of the preferred embodiments along with the following drawings.

DETAILED DESCRIPTION OF THE PREFERRED EMBODIMENTS

As is known in the art, in order to establish communications over a point-to-point (PPP) link, Link Control Protocol (LCP) packets for establishing, configuring and testing the data link connection must be exchanged over each PPP link, i.e., the $R_m$ and $U_m$, interfaces. Any options not negotiated use a predefined default value, as specified by RFC 1661.

Similarly, IPCP packets for negotiating and configuring IPCP configuration options must be exchanged over the $R_m$ and $U_m$ interfaces. Any options not negotiated use a predefined default value, as specified by RFC 1332.

As described in RFC 1661 and RFC 1332, LCP Packets and IPCP packets comprise a Configure-Request, a Configure-Ack, a Configure-Nak, and a Configure-Reject. The format of these packets is well known and described in RFC 1661 and RFC 1332.

Configuration option negotiations may occur separately for both the $R_m$ interface and the $U_m$ interface. As described in RFC 1661 and RFC 1332, the Configure-Request packet contains a list of the options being requested and the Configuration-Ack packet contains a list of the options which the sender is acknowledging.

Because the wireless communication (MT2) device 104 is typically mobile, communications between the MT2 device 104 and a IWF 108 will be handed off to another IWF 108, as necessary depending on the current location of the mobile MT2 device. Handoff techniques are well known in the art. When a handoff occurs, the PPP $U_m$ interface must be renegotiated. That is, the LCP and the IPCP configuration options must be renegotiated. During renegotiation, data cannot be sent over the $U_m$ interface. However, because negotiation of the Urn interface is independent from the $R_m$ interface, the $R_m$ interface does not necessarily undergo renegotiation after a handoff. As a result, the TE2 device 102 may continue to send data to the MT2 device 104, while the MT2 device 104 is not able to send the data over the $U_m$ interface because the MT2 device is engaged in PPP renegotiation. If renegotiation continues over too long a period of time, while the TE2 device 102 continues to send data to the MT2 device 104 over the $R_m$ interface, data will eventually be lost.

Figure 1:
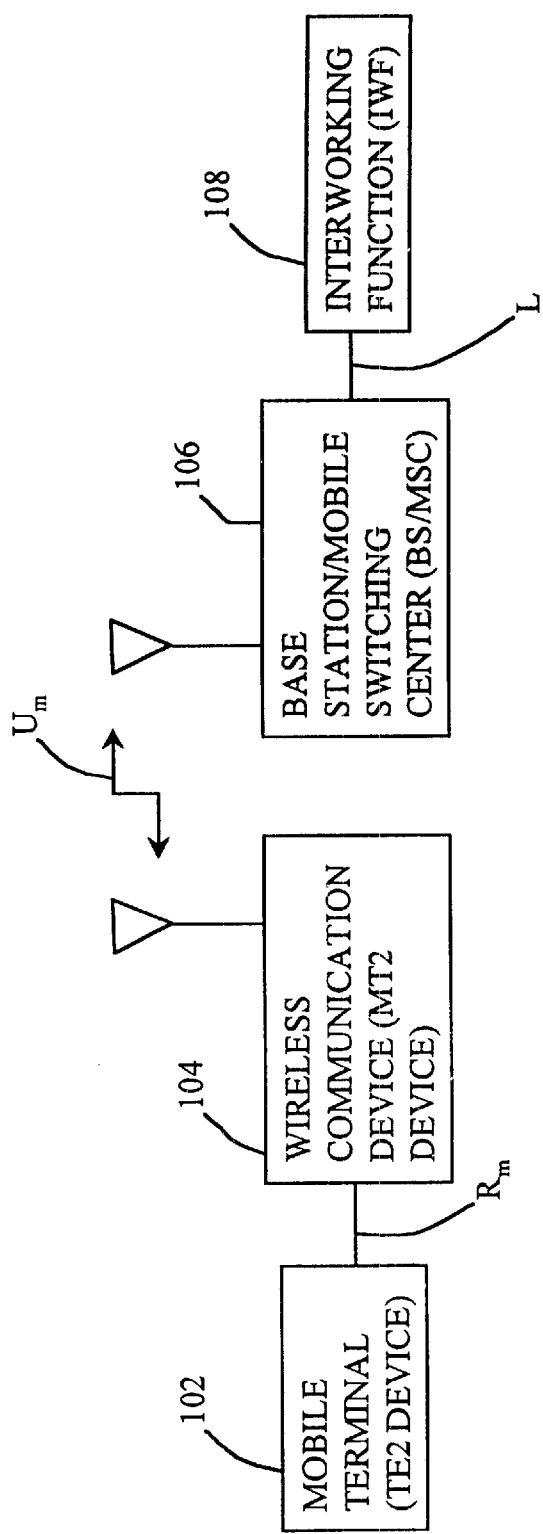
FIG. 1 illustrates a high-level block diagram of a wireless data communication system in which a terminal device connects to a network, such as the Internet, via a wireless communication device.
Figure 2:
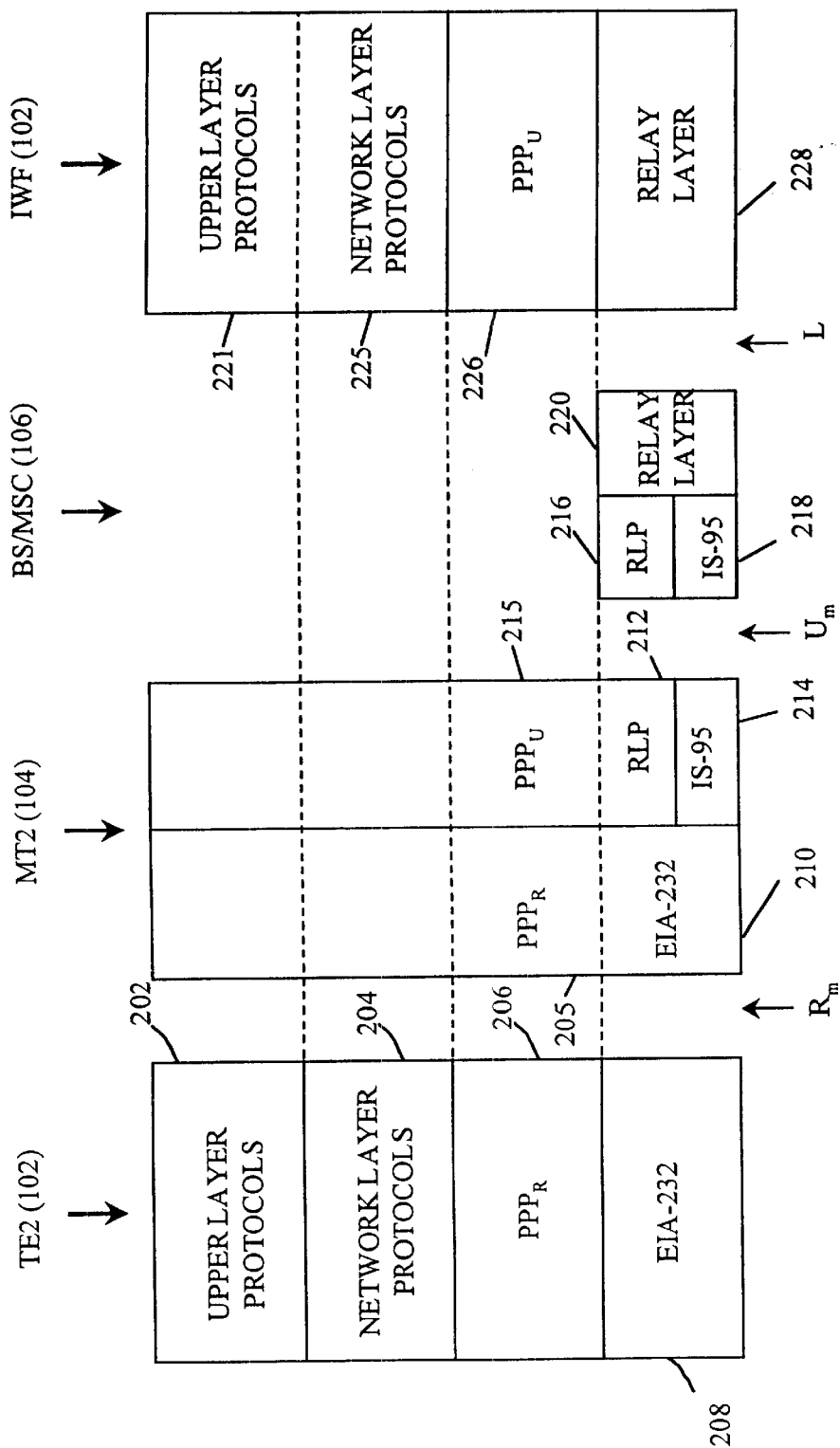
FIG. 2 is a diagram of the protocol stacks of each entity.
Figure 3:
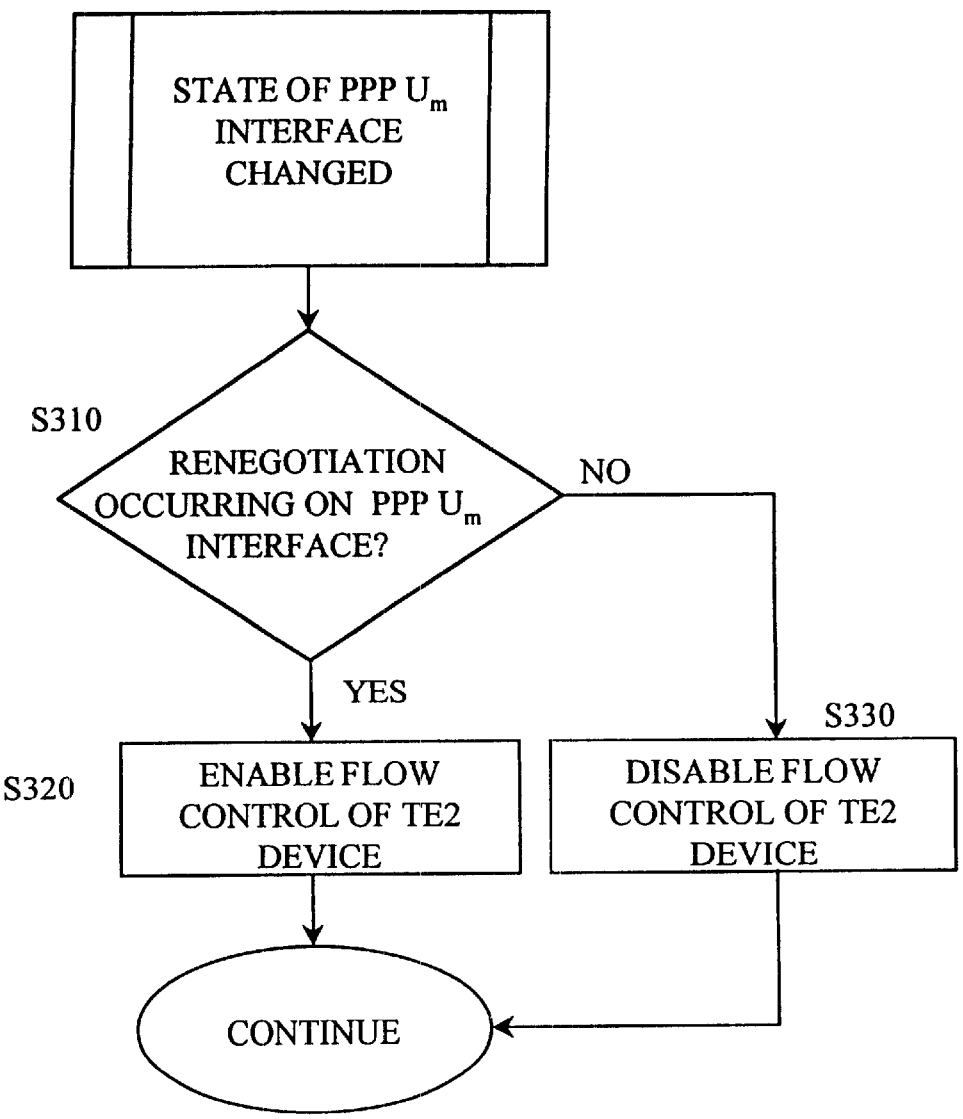
FIG. 3 is a flowchart of a first embodiment of the invention showing the processing that occurs when the MT2 device detects that the state of the PPP $U_m$ interface has changed.

FIG. 3 explains the processing in a first embodiment of the invention. The processing may be implemented by means of, for example, firmware or software.

In step S310, the state of the PPP $U_m$ interface is checked to determine whether renegotiation is now occurring. If renegotiation is occurring, then step S320 is executed to cause flow control on the PPP $R_m$ interface to be enabled, such that the TE2 device 102 will not send data to the MT2 device 104. Flow control may be accomplished, for example, by the MT2 device 104 turning off a clear to send signal on an RS232 interface to the TE2 device 102. As is well known in the art, a device such as the TE2 102 cannot send data over the RS232 interface when the clear to send signal is off.

If in step 310, it is determined that renegotiation is not occurring on the PPP $U_m$ interface, then step S330 is executed to cause flow control to be disabled. That is, no flow control of data originating from the TE2 device 102 will occur. This can be accomplished, for example, by the MT2 device 104 turning on a clear to send signal on an RS232 interface to the TE2 device 102. As is well known in the art, a device such as the TE2 102 can only send data over the RS232 interface when the clear to send signal is on.

Figure 4:
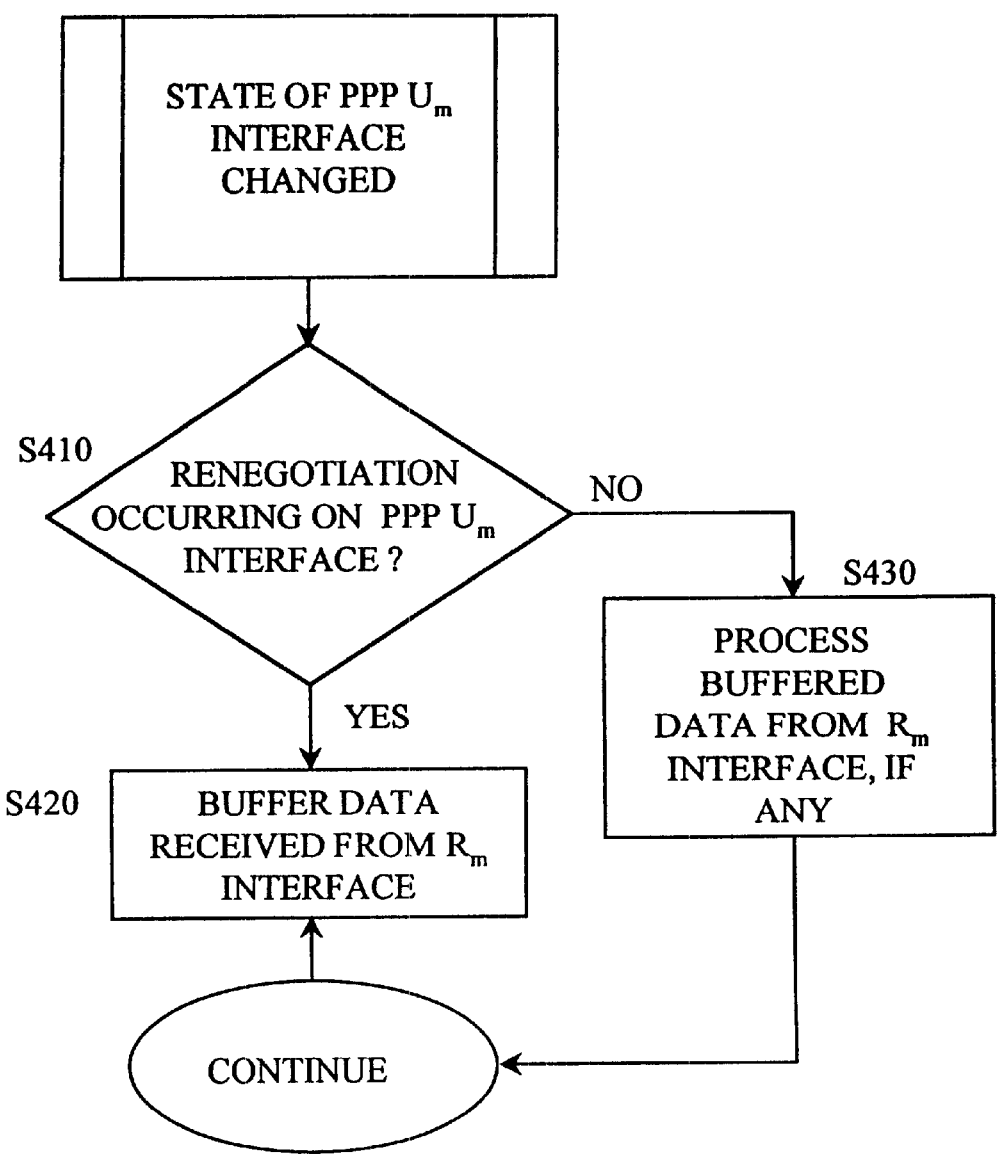
FIG. 4 is a flowchart of a second embodiment of the invention showing the processing that occurs when the MT2 device detects that the state of the PPP $U_m$ interface has changed.

After either of steps S320 or S330 are performed, normal processing continues. FIG. 4 illustrates another embodiment of the invention. Step S410 is performed to determine whether renegotiation is occurring on the PPP $U_m$ interface. If renegotiation is occurring, then step S420 is executed to cause data received over the $R_m$ interface from the TE2 device 102 to be buffered.

If, in step S410, it is determined that renegotiation is not occurring over the PPP $U_m$ interface, then step S430 is executed to cause data received from the $R_m$ interface not to be buffered, but instead, to be processed for subsequent transmission over the PPP $U_m$ interface. In addition, step S430 will cause any data already received from the PPP $R_m$ interface and buffered to be dequeued from the buffer and processed for subsequent transmission over the PPP $U_m$ interface.

After performing either of steps S420 or S430, normal processiing continues.

Without flow controlling the TE2 device 102, the embodiment of FIG. 4 may be only delaying the loss of data. If PPP $U_m$ interface renegotiation occurs over a long enough period of time, the MT2 device 104 will exhaust its buffer space and data will be lost.

Figure 5:
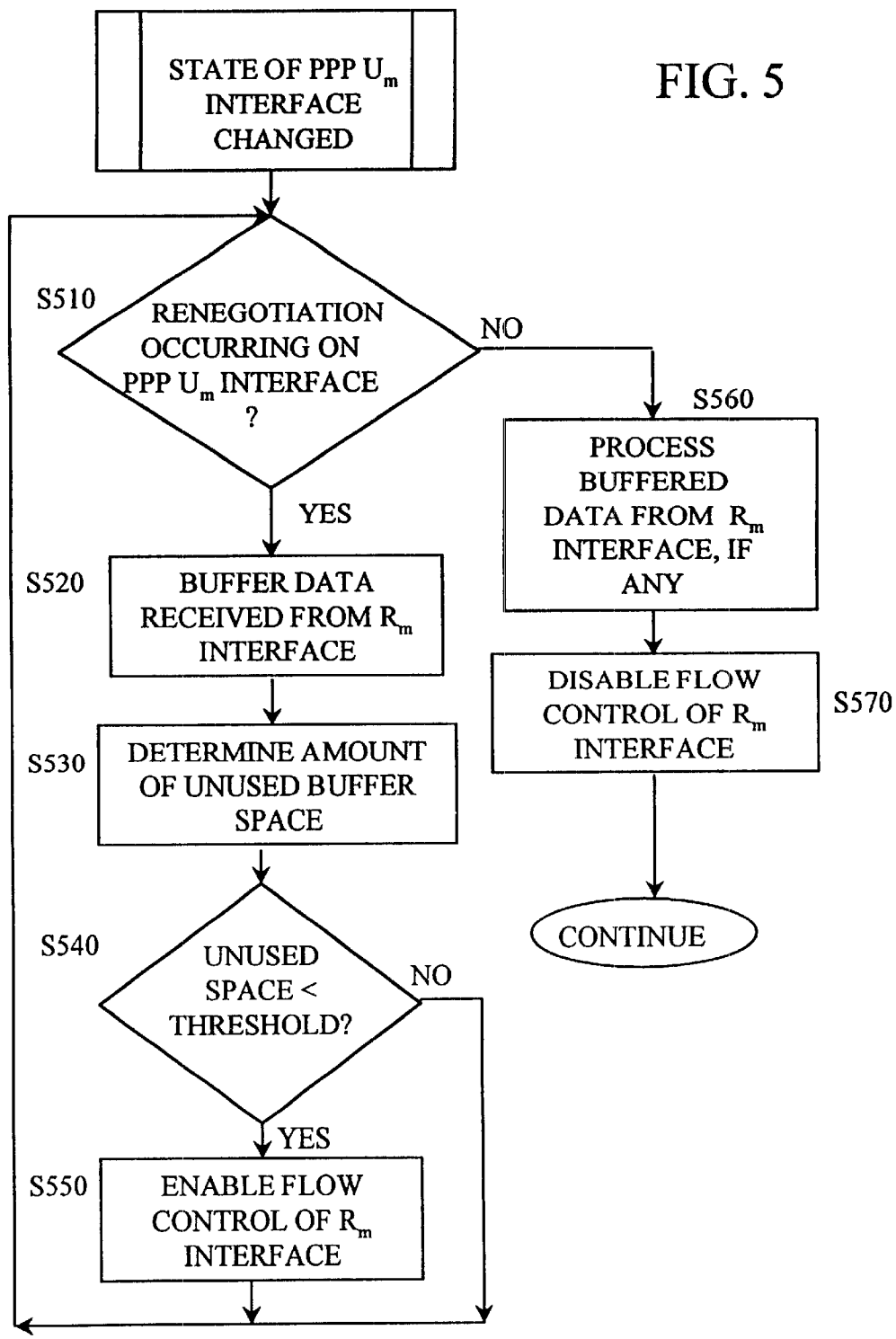
FIG. 5 is a flowchart of a variation of the second embodiment showing the processing that occurs for flow controlling a TE2 device based on an amount of available free buffer space.

FIG. 5 shows a variation of the embodiment of FIG. 4, which in addition to performing the processing of FIG. 4, also includes determining an amount of available buffer space remaining and flow controlling accordingly. Step S510 is performed to determine whether renegotiation is occurring on the PPP $U_m$ interface. If renegotiation is occurring, then step S520 is executed to cause data received over the $R_m$ interface from the TE2 device 102 to be buffered.

In step S530, the amount of free buffer space is determined. In step S540, the amount of free buffer space is compared to a threshold. If the amount of free buffer space is less than the threshold, then step S550 is performed to enable flow control of the TE2 device 102 over the $R_m$ interface and processing returns to step S510 to determine whether renegotiation on the PPP $U_m$ interface is continuing to occur.

If, in step S540, the amount of free buffer space is determined to be greater than or equal to the threshold, then flow control is not enabled and processing returns to step S510 to determine whether renegotiation on the PPP $U_m$ interface is continuing to occur.

If step S510 determines that renegotiation of the PPP $U_m$ interface is not occurring, then step S560 causes any data that was previously buffered during a renegotiation of the PPP $U_m$ interface to be processed. Step S570 is then performed to ensure that flow control is disabled and normal processing continues.

The preferred value of the threshold is hardware and software implementation dependent, taking into consideration factors including, but not limited to, for example, memory size, processor speed, data rate and expected peak traffic load.

While this invention has been described in connection with what is presently considered to be the preferred embodiments, it is to be understood that the invention is not limited to the disclosed embodiment, but on the contrary, is intended to cover various modifications and equivalent arrangements included within the spirit and scope of the appended claims.

We claim as our invention:

1. A method of preventing data loss during a PPP renegotiation on a $U_m$ interface, said method comprising:
    determining, on a MT2 device, whether said PPP renegotiation is occurring on said $U_m$ interface; and
    asserting flow control of data to be output from said TE2 device to said MT2 device, over a $R_m$ interface, when said determining determines that said PPP renegotiation is occurring on said $U_m$ interface.

2. The method of claim 1, wherein said asserting flow control comprises:
    using electrical signalling on a physical level interface between said TE2 device and said MT2 device to assert said flow control.

3. The method of claim 2, wherein said using said electrical signalling comprises turning off a clear to send signal on a RS232 interface.

4. The method of claim 1, further comprising:
    disabling said flow control of said data to be output from said TE2 device to said MT2 device, over said $R_m$ interface, when said determining determines that said PPP renegotiation is not occurring on said $U_m$ interface.

5. A method of preventing data loss during a PPP renegotiation on a $U_m$ interface, said method comprising:
    determining, on a MT2 device, whether said PPP renegotiation is occurring on said $U_m$ interface;
    buffering, in said MT2 device, data received from a TE2 device, over a $R_m$ interface, when said determining determines that said PPP renegotiation is occurring on said $U_m$ interface;
    determining whether an amount of free buffer space in said MT2 device is less than a predetermined threshold; and
    asserting flow control of data to be output from said TE2 device to said MT2 device, over said $R_m$ interface, when said amount of said free buffer space is determined to be less than said predetermined threshold.

6. The method of claim 5, wherein said asserting flow control comprises:

using electrical signalling on a physical level interface between said TE2 device and said MT2 device to assert said flow control.

7. The method of claim 6, wherein said using said electrical signalling comprises turning off a clear to send signal on a RS232 interface.

8. The method of claim 5, further comprising:

disabling said flow control when said determining determines that said PPP renegotiation is not occurring.

9. An MT2 device arranged to be connected to a TE2 device over a $R_m$ interface and to a base station/mobile switching center through a wireless $U_m$ interface, said MT2 device comprising:

means for determining whether a PPP renegotiation is occurring on said $U_m$ interface; and means for asserting flow control of data to be output from said TE2 device to said MT2 device, over said $R_m$ interface, when said determining means determines that said PPP renegotiation is occurring on said $U_m$ interface.

10. The MT2 device of claim 9, wherein said asserting means comprises:

means for using electrical signalling on a physical level interface between said TE2 device and said MT2 device to assert said flow control.

11. The MT2 device of claim 10, wherein said means for using electrical signalling comprises means for turning off a clear to send signal on a RS232 interface.

12. The MT2 device of claim 4, further comprising:

means for disabling said flow control of said data to be output from said TE2 device to said MT2 device, over said $R_m$ interface, when said determining means determines that said PPP renegotiation is not occurring on said $U_m$ interface.

13. An MT2 device arranged to be connected to a TE2 device over a $R_m$ interface and to a base station/mobile switching center through a wireless $U_m$ interface, said MT2 device comprising:

means for determining whether a PPP renegotiation is occurring on said $U_m$ interface;

means for buffering data received from said TE2 device, over said $R_m$ interface, when said determining means determines that said PPP renegotiation is occurring on said $U_m$ interface;

means for determining whether an amount of free buffer space in said MT2 device is less than a predetermined threshold; and means for asserting flow control of data to be output from said TE2 device to said MT2 device, over said $R_m$ interface, when said determining means determines that said amount of said free buffer space is less than said predetermined threshold.

14. The MT2 device of claim 13, wherein said asserting means comprises:

means for using electrical signalling on a physical level interface between said TE2 device and said MT2 device to assert said flow control.

15. The MT2 device of claim 14, wherein said means for using said electrical signalling comprises means for turning off a clear to send signal on a RS232 interface.

16. The MT2 device of claim 13, further comprising:

means for disabling said flow control when said means for determining determines that said PPP renegotiation is not occurring.

\* \* \* \* \*